US010334264B2

(12) United States Patent
Weekes et al.

(10) Patent No.: US 10,334,264 B2
(45) Date of Patent: Jun. 25, 2019

(54) METHOD OF ENCODING MULTIPLE LANGUAGES IN A VIDEO FILE FOR A GAMING MACHINE

(71) Applicant: Ainsworth Game Technology Limited, Newington (AU)

(72) Inventors: Lee Howard Weekes, Homebush (AU); Ernest Stepp, Las Vegas, NV (US); Robin Gonzales, Las Vegas, NV (US)

(73) Assignee: Ainsworth Game Technology Limited, Newington, NSW (AU)

( * ) Notice: Subject to any disclaimer, the term of this patent is extended or adjusted under 35 U.S.C. 154(b) by 5 days.

(21) Appl. No.: 15/355,935

(22) Filed: Nov. 18, 2016

(65) Prior Publication Data
US 2018/0146206 A1 May 24, 2018

(51) Int. Cl.
*H04N 19/46* (2014.01)
*A63F 13/00* (2014.01)
*H04N 21/845* (2011.01)
*H04N 21/8541* (2011.01)
*H04N 21/8545* (2011.01)

(52) U.S. Cl.
CPC ............ *H04N 19/46* (2014.11); *A63F 13/00* (2013.01); *H04N 21/8456* (2013.01); *H04N 21/8541* (2013.01); *H04N 21/8545* (2013.01)

(58) Field of Classification Search
CPC .. A63F 13/23; A63F 9/24; A63F 13/26; A63F 13/00; G07F 17/3258; H04N 19/46; H04N 21/4781; H04N 21/6125; H04N 21/6377; H04N 21/8456; H04N 21/8541; H04N 21/8545; G06F 17/28
See application file for complete search history.

(56) References Cited

U.S. PATENT DOCUMENTS

| | | | |
|---|---|---|---|
| 6,672,963 B1 | 1/2004 | Link | |
| 8,301,669 B2 | 10/2012 | O'Brien-Strain et al. | |
| 8,984,569 B2* | 3/2015 | Hurst | H04L 29/06 725/87 |
| 9,033,788 B2* | 5/2015 | George | G07F 17/32 463/25 |
| 9,270,721 B2* | 2/2016 | Krishna | H04N 21/23439 |
| 9,462,309 B2* | 10/2016 | Kaiser | G06F 3/048 |

(Continued)

FOREIGN PATENT DOCUMENTS

WO WO 2007/033207 3/2007
WO WO 2015/103636 7/2015

*Primary Examiner* — Dramos Kalapodas
(74) *Attorney, Agent, or Firm* — Cook Alex Ltd.

(57) ABSTRACT

The invention provides a method of encoding multiple languages in a video file for use in a gaming machine, comprising encoding first video file segments in first language, encoding second video file segments in a second language and encoding one or more third video file segments that do not display any language. A first set of instructions is executable by a computing device of the gaming machine to combine the first and third video file segments into a video presentation in the first language to be displayed on a display of the gaming machine. A second set of instructions is executable by the computing device to combine the second and third video file segments into a video presentation in the second language to be displayed on the display. Related methods and systems are also provided.

3 Claims, 12 Drawing Sheets

(56) References Cited

U.S. PATENT DOCUMENTS

| | | | |
|---|---|---|---|
| 2007/0009042 A1* | 1/2007 | Craig | H04N 19/176 375/240.24 |
| 2008/0184120 A1* | 7/2008 | OBrien-Strain | G11B 27/326 715/723 |
| 2011/0164175 A1* | 7/2011 | Chung | H04N 21/4126 348/468 |
| 2013/0093779 A1 | 4/2013 | Lyons et al. | |
| 2013/0124186 A1* | 5/2013 | Donabedian | G06F 17/289 704/2 |
| 2014/0213340 A1* | 7/2014 | Michels | G07F 17/34 463/20 |
| 2014/0337989 A1* | 11/2014 | Orsini | H04L 51/12 726/26 |
| 2015/0143221 A1* | 5/2015 | Ahuja | G06F 17/241 715/230 |
| 2016/0182971 A1* | 6/2016 | Ortiz | H04N 21/8133 725/34 |
| 2017/0046778 A1* | 2/2017 | Corley | G06Q 30/0613 |

* cited by examiner

| | | | |
|---|---|---|---|
| guageFlicProject > MultiLangGame > Files > mystery_sap > English | | | |
| Name | Date modified | Type | Size |
| Major_blue.bk2 | 19/09/2016 4:03 PM | BK2 File | 29,721 KB |
| Major_blue.png | 5/09/2016 4:06 PM | PNG image | 483 KB |
| Major_green.bk2 | 19/09/2016 3:59 PM | BK2 File | 29,775 KB |
| Major_green.png | 5/09/2016 4:21 PM | PNG image | 439 KB |
| Major_purple.bk2 | 22/09/2016 10:16 ... | BK2 File | 29,667 KB |
| Major_purple.png | 22/09/2016 9:49 AM | PNG image | 487 KB |
| Major_red.bk2 | 19/09/2016 3:56 PM | BK2 File | 29,605 KB |
| Major_red.png | 5/09/2016 4:14 PM | PNG image | 419 KB |
| MegaChoice_Meter.bk2 | 22/09/2016 9:19 AM | BK2 File | 4,462 KB |
| MegaChoice_Meter.png | 21/09/2016 4:56 PM | PNG image | 762 KB |
| Meter_blue.bk2 | 22/09/2016 9:21 AM | BK2 File | 5,462 KB |
| Meter_blue.png | 21/09/2016 4:57 PM | PNG image | 603 KB |
| meter_green.bk2 | 22/09/2016 9:22 AM | BK2 File | 5,499 KB |
| meter_green.png | 21/09/2016 4:58 PM | PNG image | 593 KB |
| meter_purple.bk2 | 22/09/2016 9:24 AM | BK2 File | 5,484 KB |
| meter_purple.png | 21/09/2016 4:59 PM | PNG image | 607 KB |
| meter_red.bk2 | 22/09/2016 9:25 AM | BK2 File | 5,484 KB |
| meter_red.png | 21/09/2016 4:57 PM | PNG image | 577 KB |
| Minor_blue.bk2 | 19/09/2016 4:05 PM | BK2 File | 29,289 KB |
| Minor_blue.png | 5/09/2016 4:09 PM | PNG image | 467 KB |
| Minor_green.bk2 | 19/09/2016 4:01 PM | BK2 File | 29,337 KB |
| Minor_green.png | 5/09/2016 4:23 PM | PNG image | 432 KB |
| Minor_purple.bk2 | 22/09/2016 10:18 ... | BK2 File | 29,260 KB |
| Minor_purple.png | 22/09/2016 9:54 AM | PNG image | 471 KB |
| Minor_red.bk2 | 19/09/2016 3:57 PM | BK2 File | 29,194 KB |
| Minor_red.png | 5/09/2016 4:16 PM | PNG image | 404 KB |
| sap.dat | 22/09/2016 2:43 PM | DAT File | 3 KB |

FIG. 5B

METHOD OF ENCODING MULTIPLE LANGUAGES IN A VIDEO FILE FOR A GAMING MACHINE

BACKGROUND

The present invention relates to a method and system of encoding multiple languages in a video file for a gaming machine. The invention has been developed primarily for use as an electronic gaming machine and will be described hereinafter by reference to this application. However, it will be appreciated that the invention may also be implemented for any type of gaming machine that uses software to implement the game played on the gaming machine, including an electro-mechanical gaming machine.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve displaying a game and awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

One type of gaming machine comprises a mechanical or electro-mechanical device, where a motor rotates a plurality of annular rings or drums that form reels. Each reel has a reel strip that displays game symbols in preset game symbol positions. A frame covers the rings to provide a window through which only a subset of game symbol positions (and hence game symbols) were visible to the player. Thus, for a game using a 5×3 array, the window would only permit three rows of five rings to be visible to create the game array. An internal game controller within the gaming machine controls operation of the motor and hence rotation of the reels. Thus, by controlling when each reel starts and stops in its respective rotation, the game controller controls the display of the game symbols in the window. Sensors linked to the reels indicate which game symbols are displayed in the window and communicate with the game controller so that the game controller is able to award prizes based on winning combinations of game symbols displayed on the reels in the window. The game controller typically comprises one or more electric circuits for controlling various functions of the gaming machine, such as the above mentioned control of the motor, communicating with the sensors, verifying that the correct amount of a bet has been made via one or more value receiving mechanisms to enable operation of the motors, controlling any visual and/or audio effects associated with operation of the gaming machine and controlling operation of various alarms to alert any tampering with the gaming machine.

Another type of gaming machine, known as an electronic gaming machine or EGM, replaces the mechanical reels and motor with a video display screen on which video images of the reels are displayed. The EGM has an internal electronic game controller, typically a computer, that controls the display of images on the video display screen so that the reels are visibly spun on the screen to simulate a physical reel of a traditional gaming machine. EGMs tend to be more versatile in providing game information, varying the probabilities for a player to win a prize and varying the type of game that is played.

When games are implemented for play on a gaming machine, a game file is typically uploaded onto the memory storage of the internal game controller of the gaming machine. In the case of an electro-mechanical gaming machine, the internal game controller then operates the electrical circuits that in turn drive the motors to rotate the mechanical reels and operate the sensors. In the case of an EGM, the software loaded onto the memory storage, the electronic game controller controls the images displayed to perform the game on the EGM.

The game file will include video files for displaying video images during play of the game on the EGM, either on the display of the EGM or a display on a "topper" mounted to the top of an electro-mechanical gaming machine. Where the game is intended to be played in more than one jurisdiction or country, the video file may include multi-language support for each jurisdiction in which the game is installed into the EGM. This permits the EGM to display the same video content with differences in specific or different languages, where required. That is, the written text embedded into the video image is usually market or language specific. For example, an EGM may be supplied to a venue operator who may have venues spread across North and South America. Hence, the game files will require language support in English, Spanish and Portuguese. To meet this requirement, conventionally, separate video files are prepared for each language and the appropriate video file is selected for the correct language at installation in the gaming venue. This arrangement necessarily increases the number and size of the video files in of the game file. Consequently, this increases the usage of memory on the game file carrier medium and the EGM, and increases the demand on memory storage requirements of both the carrier medium and the EGM. This can lead to minimization of the use of text in the video images or presentations to reduce need to provide multi-language support in the game file. This approach is also inefficient, as this method can often lead to duplication of video images that do not display any text, since a complete video file containing all the video images for the game in each language must be provided.

Furthermore, older gaming machines have processors or game controllers with lower processing power and/or memory. Hence, these older gaming machines are unable to handle large file sizes that may occur for game files with multiple language options, and so are unable to be updated with new games. Thus, there is a limit on the file size for a game file in order for the game to be installed on an older gaming machine.

It is an object of the present invention to overcome or substantially ameliorate one or more of the disadvantages of prior art, or at least to provide a useful alternative.

SUMMARY

One embodiment of the invention provides provides a method of encoding two or more languages into a video file for a gaming machine comprising:

encoding one or more first video file segments that display a first language;

encoding one or more second video file segments that display a second language;

encoding one or more third video file segments that do not display any language;

programming a first set of instructions executable by a computing device to combine the first and third video file segments into a video presentation in the first language to be displayed on the display; and programming a second set of instructions executable by the computing device to combine the second and third video file segments into a video presentation in the second language to be displayed on the display.

Another embodiment of the invention provides method of encoding two or more languages into a video file for use in a gaming machine having a display, comprising:

encoding a first group of the video file segments having video frames in a first language to be displayed on the display;

encoding a second group of the video file segments having video frames in a second language to be displayed on the display;

encoding a third group of the video file segments having video frames without any language to be displayed on the display;

programming a first set of instructions executable by a computing device to combine the first and third group of video file segments into a video presentation in the first language to be displayed on the display; and programming a second set of instructions executable by the computing device to combine the second and third group of video file segments into a video presentation in the second language to be displayed on the display.

A further embodiment of the invention provides method of encoding two or more languages into a video file for use in a gaming machine, comprising:

providing a plurality of video file segments corresponding to video frames to be displayed on a display of the gaming machine as a video presentation;

designating a first group of the video file segments having video frames in a first language;

designating a second group of the video file segments having video frames in a second language;

designating a third group of the video file segments having video frames without any language;

creating a first playlist from video file segments of the first group and the third group so that sequential display of the video frames creates a video presentation in the first language;

creating a second playlist from video file segments of the second group and the third group so that sequential display of the video frames creates a video presentation in the second language; and providing instructions accessible by a computing device to select the first or second playlist for use in the gaming machine.

Yet another embodiment of the invention provides a method of encoding two or more languages into a video file for use in a gaming machine, comprising:

providing a plurality of video file segments corresponding to video frames to be displayed on a display of the gaming machine as a video presentation;

encoding a first portion of one or more of the video file segments with video information having text in a first language;

encoding a second portion of the one or more of the video file segments with video information having text in a second language;

encoding a third portion of the one or more of the video file segments with video information that does not have any text;

creating a first playlist using the first portion and the third portion of each video file segment so that sequential display of the video frames corresponding to the video file segments results in a video presentation in the first language;

creating a second playlist using the second portion and the third portion of each video file segment so that sequential display of the video frames corresponding to the video file segments results in a video presentation in the second language; and providing instructions accessible by a computing device to select the first or second playlist for use in the gaming machine.

A further embodiment of the invention provides a network of gaming machines in electronic communication with a computing device, wherein the computing device is adapted to perform the method of the above described embodiments of the invention.

A yet further embodiment of the invention provides a computer system comprising a central processing unit configured for communication with a gaming machine, wherein said computer system is configured to perform the method of the above described embodiments of the invention.

A further embodiment of the invention provides a computer program configured to perform the method of the above described embodiments of the invention.

A further embodiment of the invention provides a non-transitory computer readable carrier medium carrying computer executable code that, when executed on a central processing unit configured for communication with a gaming machine, causes the central processing unit to perform the method of the above described embodiments of the invention.

A further embodiment of the invention provides a system for encoding two or more languages into a video file for use in a gaming machine, comprising:

a non-transitory computer readable carrier medium for storing the video file; and a first computing device configured to:

encode one or more first video file segments that display a first language into the video file;

encode one or more second video file segments that display a second language into the video file;

encode one or more third video file segments that do not display any language into the video file;

program a first set of instructions executable by a second computing device to combine the first and third video file segments into a video presentation in the first language to be displayed on a display of the gaming machine; and program a second set of instructions executable by the second computing device to combine the second and third video file segments into a video presentation in the second language to be displayed on the display.

A further embodiment of the invention provides a gaming machine comprising:

a display for displaying a game, wherein the game comprises the display of one or more video presentations during the game;

a game controller for controlling the display of the video presentations on the display; and a game file comprising a video file having:

one or more first video file segments that display a first language;

one or more second video file segments that display a second language;

one or more third video file segments that do not display any language;

a first set of instructions executable by the game controller to combine the first and third video file segments into a video presentation in the first language;

a second set of instructions executable by the game controller to combine the second and third video file segments into a video presentation in the second language;

wherein the game controller is programmable to select one of the first and second set of instructions; and in response to the selection of the first or second set of instructions, the game controller executes the selected set of instructions to display the video presentation in the first or second language.

A further embodiment of the invention provides a gaming machine comprising:

a display for displaying a game, wherein the game comprises the display of one or more video presentations during the game;

a game controller for controlling the display of the video presentations on the display;

a value transfer mechanism for receiving value from a player, wherein the game controller communicates with the value transfer mechanism such that when a threshold amount of value has been received from the value transfer mechanism, the game controller initiates a play of the game; and a game file comprising a video file having:
one or more first video file segments that display a first language;
one or more second video file segments that display a second language;
one or more third video file segments that do not display any language;
a first set of instructions executable by the game controller to combine the first and third video file segments into a video presentation in the first language;
a second set of instructions executable by the game controller to combine the second and third video file segments into a video presentation in the second language;

wherein the game controller is programmable to select one of the first and second set of instructions; and in response to the selection of the first or second set of instructions, the game controller executes the selected set of instructions to display the video presentation in the first or second language.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which:

FIGS. 4A and 4B are simulated screen shots illustrating the same screen in two different languages;

FIGS. 5A and 5B are spreadsheet extracts illustrating file sizes for different languages;

DETAILED DESCRIPTION OF VARIOUS EMBODIMENTS

Figure 1:
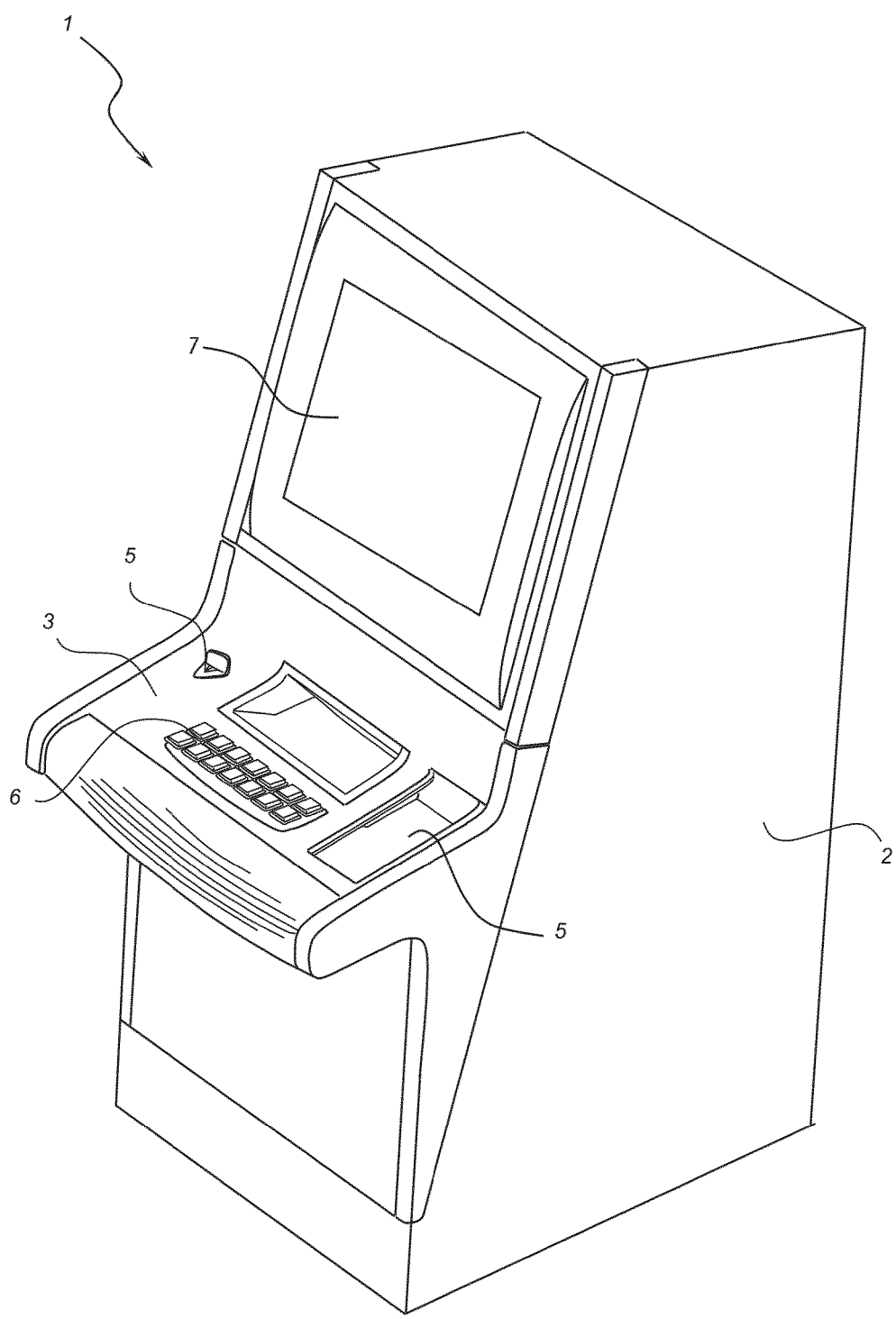
FIG. 1 is a perspective view of a gaming machine.

The present invention will now be described with reference to the following examples which should be considered in all respects as illustrative and non-restrictive. In the Figures, corresponding features within the same embodiment or common to different embodiments have been given the same reference numerals.

By way of general discussion, the structure and operation of a gaming machine will now be described to provide context for the application of the invention to a gaming machine. Referring to FIG. 1, a gaming machine 1 comprises a cabinet 2, a console 3 and an internal game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the gaming machine 1. Other forms of value include gaming tokens, paper, tickets, vouchers, and any other object representative of value.

Figure 2:
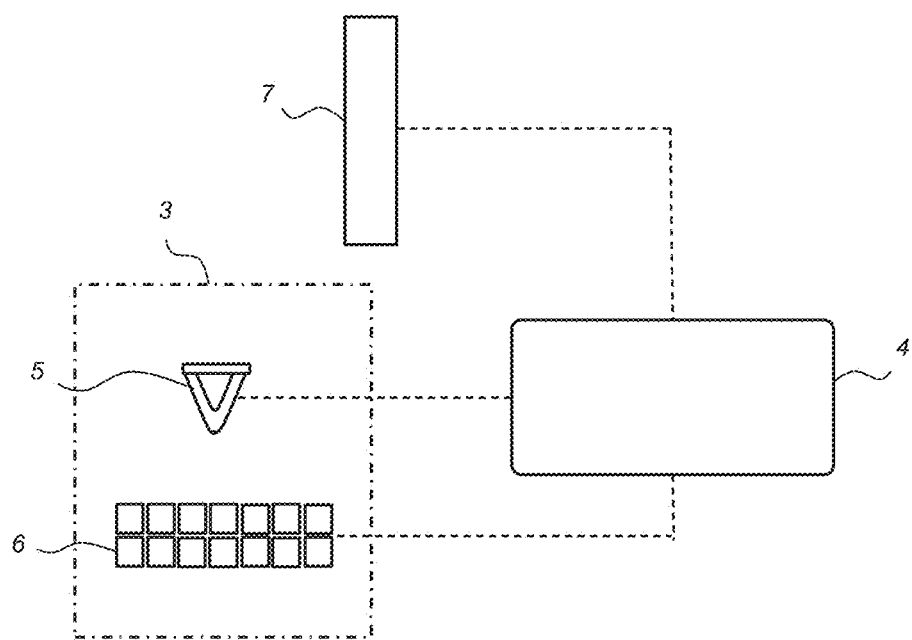
FIG. 2 is a schematic drawing of a game controller for the gaming machine of FIG. 1.

The game controller 4 is generally in the form of an electronic game controller comprising a central processing unit, such as a microprocessor or other computing device, and is in electronic communication with a display in the form of a video display screen 7, as well as various input devices on the console 3, as best shown in FIG. 2. Typically, the electronic game controller 4 also comprises a random access memory (RAM) associated with the central processing unit, the RAM being used to store program instructions and transient data related to the operation of the electronic game controller and hence the gaming machine 1. The RAM contains a body of program instructions for implementing a game on the gaming machine 1, as discussed in more detail below. The central processing unit or processor may also be operatively associated with a further storage device, such as a hard disk drive, which is used for long-term storage of program components and data relating to the electronic game controller 4 and/or the gaming machine 1, including a database for game performance data, as well as information gathered from users. It is also appreciated that a person skilled in the art would readily understand the location and use of the electronic game controller 4 in the gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the gaming machine 1. If not, the electronic game controller 4 will send a signal to the display 7 to show a message requesting further value to be added to the gaming machine 1.

Figure 3:
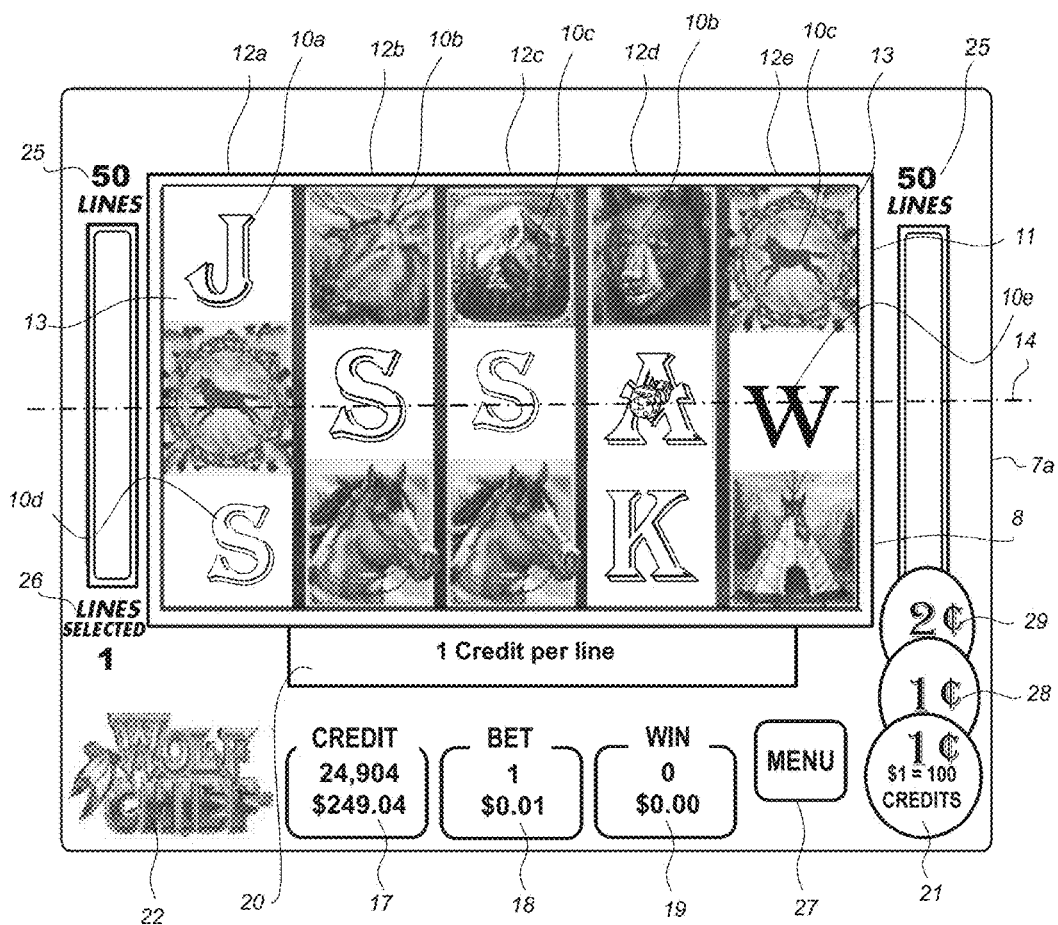
FIG. 3 is a front view of the display of the gaming machine of FIG. 1 illustrating a game.

The electronic game controller 4 is programmed to provide a game in the form of a base game 8 (as best shown in FIG. 3) and a feature game 9 (not shown) on a lower playing area 7a of the display 7 of the gaming machine 1 for play by a player. An upper display area (not shown) is reserved for showing artwork associated with the game(s) that are available for play on the gaming machine and/or other game information. The base game 8 has game symbols 10 arranged into an array 11 in the form of five columns or "reels" 12. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7a, including showing the game symbols 10, array 11 and other visible elements of the games.

The array 11 of the base game 8 defines predetermined game or symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

The array 11 is arranged so that a player can select one or more predetermined "pay lines" 14 defined around the array, which correspond to combinations of the symbol or game positions 13. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols to trigger the feature game 9. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10a, animal-themed symbols 10b, item-themed symbols 10c, scatter symbols in the form of S symbols 10d and a substitute or wild card symbol in the form of W symbols 10e. The electronic game controller 4 randomly determines the appearance of the game symbols 10 on the array 11.

The video screen 7 also displays other standard game information including the amount of player credits 17, the amount of the current bet wagered by the player 18, the amount of wins by the player 19, a message area 20, a current denomination button 21 indicating the currently selected base bet denomination, the name 22 of the game that the base game 8 belongs to, being Wolf Chief™, the number of pay lines available 25 and the number of player-selected pay lines 26. The video screen 7 also displays a menu button for bringing up a menu screen 27 (typically explaining the game rules and showing the available pay lines 14), any denomination images 28, 29 that "pop" up when the denomination button 21 is selected and/or jackpot information relating to the base game 8 and feature game 9 that are awarded by the electronic gaming machine (EGM) 1. This jackpot information is typically displayed in the upper display area and can comprise, in descending order of monetary value, a grand jackpot, major jackpot, minor jackpot and midi jackpot.

In the base game 8, the player initially makes a bet using vending slots 5 to initiate play of the gaming machine 1 by building up credit to play the base game 8 on the gaming machine. For example, the player can bet or wager monetary amounts equivalent to a particular amount of credits, depending on the bet denomination selected for the base game. Also, the player can make any additional side bets or ante-bets during play of the base game 8 once the base game has commenced to access additional features in the base game, such as increasing the number of winning combinations in the base game.

Typically, gaming machines offer a number of preset bet options that the player can make, and these bet options can vary depending on the game or games offered on the gaming machine. For example, a game on a gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

The gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the gaming machine has not yet been played or has been started up, the default bet denomination is initially selected by the electronic game controller 4. The default bet denomination can be randomly selected or chosen according to a predetermined order. Usually, the electronic game controller 4 will select the bet denomination with the lowest value that is available for the base game 8, which would be the 1¢ bet denomination for this embodiment. The player may change the bet denomination at any time in the base game 8 by touching the denomination button 21 before or after the reels 12 have spun. In this embodiment, touching the denomination button will bring denomination images that the player may select to quickly change the bet denomination between plays of the game 8.

Once the player has commenced play of the game 8 by making an appropriate bet via the vending slots 5, the electronic game controller 4 then commences a play of the base game 8 by sending a signal to the display 7 to cause the reels 12 to appear to visibly rotate or "spin" in a linear path, typically in a downward vertical direction, and randomly display the game symbols 10 in each game position for each play of the array 11 for the base game 8. After the reels 12 stop spinning (and thus ends the spin or play of the base game 8), the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination.

The electronic game controller 4 also determines whether the feature game 9 should be activated, based on a predetermined trigger event, such as the appearance of a number of trigger symbols appearing in a play or spin of the base game 8. In this embodiment, the trigger event is the appearance of three scatter symbols 10*d*, as best shown in FIG. 3. The scatter symbols 10*d* need not appear on the same pay line 14, but can appear on any of the player-selected pay lines.

In response to the trigger event, the electronic game controller 4 then transmits a signal to the video screen 7 to cause the feature game 9 to appear on the video screen 7, as best shown in FIG. 4. In this embodiment, the feature game 9 uses the same game symbols 10 as the base game 8, as well as the same array 11, reels 12, game positions 13 and player-selectable pay lines 14 on the video screen 7. In the feature game 9, ten free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game 9. In addition, it will be appreciated that in the art free spins are commonly referred to as "free games". The number of free games remaining in the feature game 9 is indicated by a counter 51. Typically, the prizes awarded for the same winning combinations of game symbols in the feature game 9 are of higher value than the prizes awarded in the base game 8.

The feature game 9 operates in a similar manner to the base game 8, where the reels 12 visibly rotate and display randomly selected game symbols 10 in each game position 13. Predetermined winning combinations of randomly selected game symbols 10 in the array of the feature game 9 also result in the award of prizes to the player, usually of an enhanced value compared to the prizes awarded in the base game 8.

The base game 8 and feature game 9 are typically stored on a computer readable game file for use in a gaming machine, such as gaming machine 1. The computer readable game file is typically written to and stored in a computer readable carrier medium, such as a memory card, smart card, a radio frequency identification (RFID) device, USB key or drive, magnetic card or other equivalent portable electronic storage device. Preferably, the carrier medium comprises a flash memory card (such as a Compact Flash card, also referred to as a CF card) as this form of carrier medium is commonly used in the gaming industry. However, it will be appreciated that other embodiments make use of alternate carrier media, and the present disclosure should not be limited to any particular form of carrier medium. The writing may be achieved by substantially any conventional technique, and involves writing data to the carrier medium.

The game file provides a set of computer executable code or instructions for the game controller 4 of the gaming machine 1 to implement and operate the games 8, 9 on the gaming machine 1. The computer readable game file may comprise data components relating to static image information, audio information, video information and/or game information. The video information comprises video images or frames for displaying static or animated video images used during play of the games 8, 9. The game information may include textual information relating to the game rules, game title and other descriptive text, which may also form part of the video information, as well as mathematical information for implementing the games 8, 9, such as reel strip information, probability tables and the like. The game file also has verification information to confirm that the game file is authorised for use by the operator (casino, club, etc.) in the gaming machine 1 and is compliant with the necessary conditions on which the games 8, 9 have been approved by regulatory authorities.

Playing video files is a standard feature of any EGM, however when adding support for multi-language there are added complexities. With multi-language support for an EGM, the operator is provided with the ability to switch the language at any time, but this adds complexities to the game file. Although most of the video images and art can be provided without any localization of language, this imposes limits on the use of text in the video images, placing limitations on the artist and stops text being animated in a video presentation. To overcome this typically different video files would be produced for each language which means a full copy of the video exists for every language. Having two copies of every file uses a large amount of disk space, increases memory load when playing the video presentation, as well as adding complexity to the software to switch the video files as the language is changed.

Referring to FIGS. 4A and 4B, an example of two video images or frames using different languages is illustrated. In FIG. 4A, the video frame 35 shows a RESERVED message 36 in English, while the video frame 37 shows the same message in Spanish—RESERVADO 38. Frequently, these video images are often accompanied by animation or other visual effects so that there will be a plurality of video frames containing the same text in a particular language. For example, the RESERVED message 36 in the video frame 35 is typically rotated in an "idle" animation, requiring about 75 individual video frames to show the message rotating about a vertical axis. The same amount of video frames would also be required to animate the RESERVADO message 38 shown in the video frame 37. Therefore, for this animated sequence of a rotating reservation message in both English and Spanish, two separate video files have to be created and stored in the game file totalling 150 video frames.

This process is repeated for any set of video frames displaying written text, especially where the video frames form part of an animated or visual effect sequence. By way of another example, when a jackpot prize is won, the jackpot prize name (such as GRAND, MAJOR, MINI or MINOR) is usually moved around the screen accompanied by visual (and audio) effects. This would involve approximately 300 individual video frames. Again, two sets of video frames, one in English and another in Spanish, and hence two separate video files (each comprising 300 video frames for a total of 600 video frames) are required to support both languages.

The provision of different languages also extends to the elements of the base game 8 or feature game 9. Therefore, the English language text BET for the bet meter 17, CREDIT for the credit meter 18, WIN for the win meter 19, the text in the message area 20, denomination button 21, game name 22, available pay line indicator 25, selected pay line indicator 26 and menu screen 27 all need to have a translated counterpart for the other languages to be supported in the game file, such as Spanish, German, Chinese, etc. In addition, any game symbols 10 that employ words, such as BONUS or WILD, also have to be translated into the other languages.

Figure 5A:
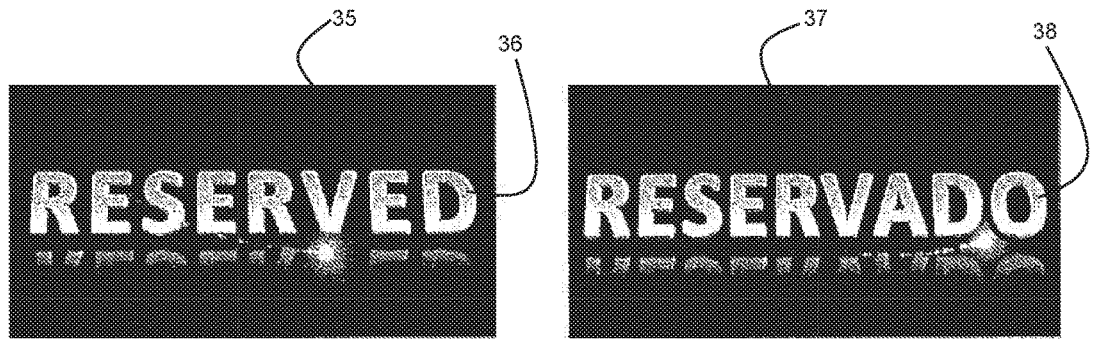

This results in separate language "channels" being programmed and stored as separate video files in the game file for each language to be supported, with each channel comprising video frames for the entire game, some of the video frames being in the supported language where text is displayed. As a result, the amount of memory devoted to video files for each game file substantially increases for each language that must be supported. For example, supporting two languages for a game doubles the amount of memory used by video files for each game file—one video file containing all the video images or frames used in the game in, for example, English, and one video file containing the same video images or frames but in, for example, Spanish. Referring to FIGS. 5A and 5B, an example of video files for the same game is illustrated, where the video files relate to video images for showing a progressive (jackpot) win on an EGM and are shown with their file size. The video files 40 are in English (as shown in FIG. 5A) and the video files 42 are in Spanish (as shown in FIG. 5B). The video files 40, 42 have essentially same video images or frames with the only difference in some of those video files being the written text in English or Spanish, respectively. It can be seen that the video files 40, 42 have file sizes of over 250 MB each. Thus, the total file size of the English and Spanish video files 40, 42 is over 500 MB. Including another language would add a similar amount to the total file in memory requirements. Thus, language support for video files for progressive wins would, for example, total over 2 GB for 10 languages.

This demand on memory space in the game file for individual video files in each supported language greatly increases the file size of game files. This places a restriction on game designers and there is only a limited amount of memory left on the game file for the other parts of the game, such as processing tasks relating to the random display of game symbols, triggering of feature games and awarding of prizes. Also, the increased file size means that older gaming machine and/or EGMs with lower processing power and/or memory storage are unable to access newer games that tend to have larger file sizes due in part to the necessity to include video files for each language.

Accordingly, the embodiments of the invention have been developed to reduce memory requirements to alleviate and/or eliminate these current problems besetting game design.

Figure 6:
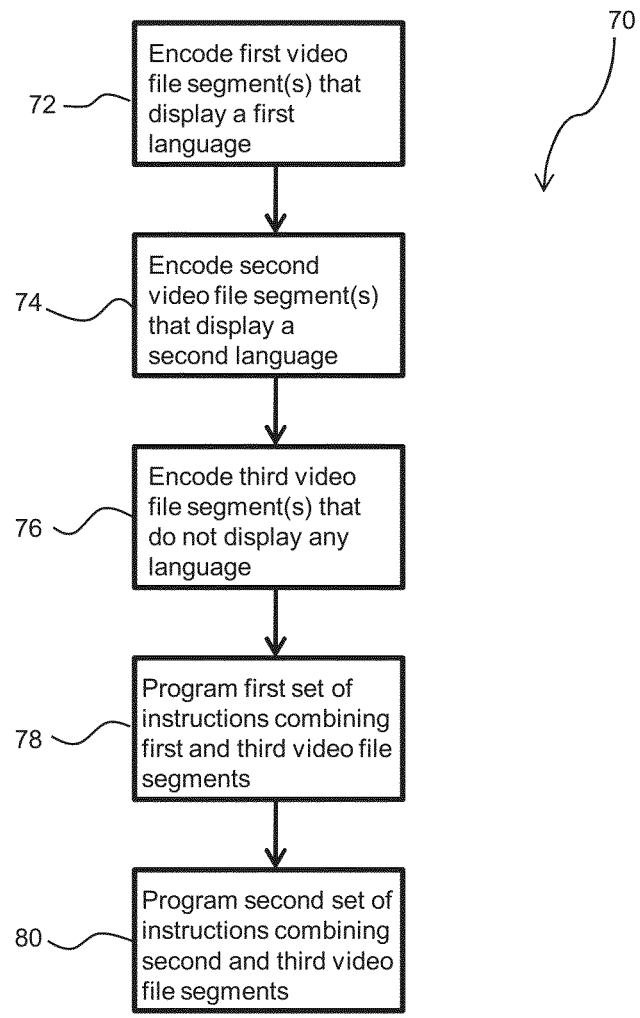
FIG. 6 is a schematic drawing illustrating a method according to one embodiment of the invention.

Referring to FIG. 6, a method 70 of encoding multiple languages into a video file for a gaming machine according one embodiment of the invention comprises encoding at step 72 one or more first video file segments that display a first language (for example, English) and encoding at step 74 one or more second video file segments that display a second language (for example, Spanish). One or more third video file segments that do not display any language (i.e., display only video images without any written text) are also encoded at step 76. It will be appreciated that there is no order in encoding steps 72, 74 and 76, and they may be done in any sequence or even simultaneously.

The method 70 also involves programming a first set of instructions at step 78 and a second set of instructions at step 80. The first set of instructions is executable by a computing device (such as an internal game controller 4 of a gaming machine 1 or other processor like a server) to combine the first and third video file segments into a video presentation in the first language (English in this example) to be displayed on the display. The second set of instructions executable by the computing device to combine the second and third video file segments into a video presentation in the second language (Spanish in this example) to be displayed on the display. Thus, the first and second sets of instructions are essentially "playlists" or a "channel" of video frames that create video presentations in each language.

This method 70 thus uses common elements of the video files that do not require the display of written text to create individual streams or channels for each supported language, each channel including a text component in the supported language. Hence, there is no need to duplicate the video files that do not have a language component, unlike the conventional approach, and so there is a significant saving in memory space and requirements. Taking the video files 40, 42 in FIGS. 5A and 5B, it has been found that employing this method 70 results in a reduction of about half for two languages and in the case of 10 supported languages there is about a 90% reduction in memory usage, leading to video files having a file size of around 10% of the file size of the conventional multi-language video files.

Figure 7:
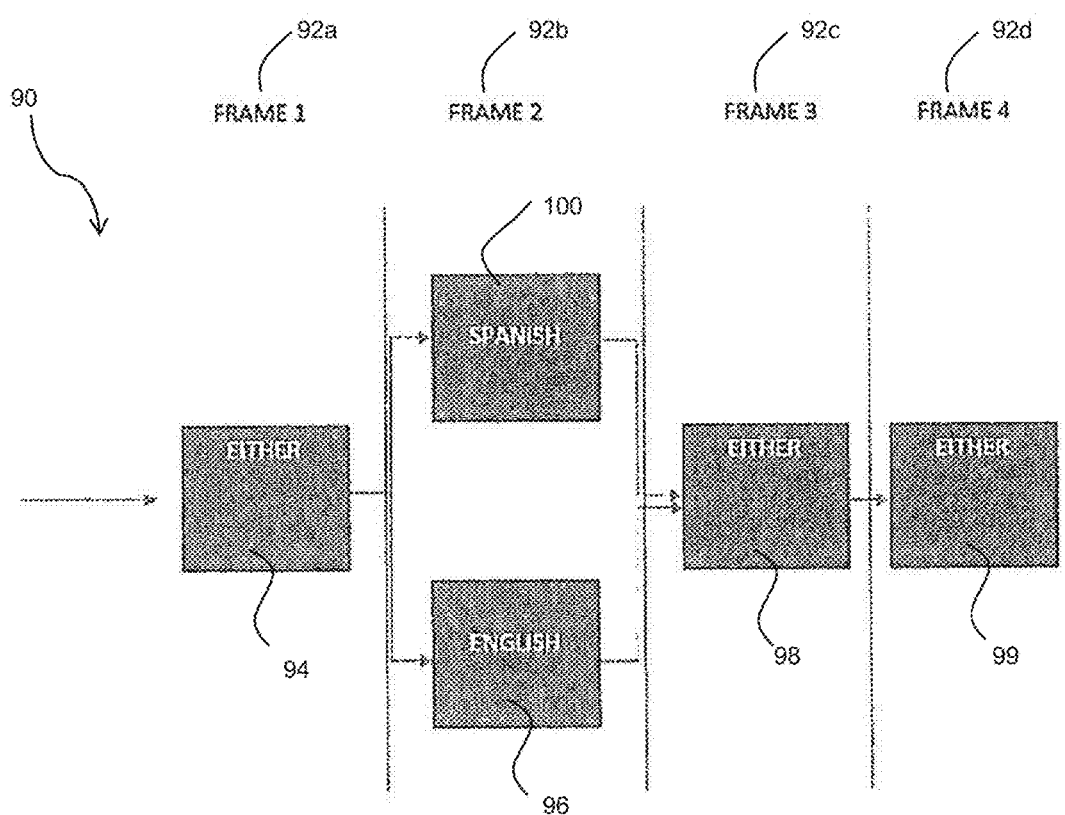
FIG. 7 is a schematic drawing illustrating one implementation of the method of FIG. 6.

It will be appreciated that the method 70 may be implemented in several ways to encode the first and second set of instructions. One manner of implementation is illustrated in FIG. 7, which illustrates implementation of the method 70 with reference to individual video frames stored on the game file. The flow chart 90 shows which video frames are selected for display as part of a continuous video sequence to form a video presentation on the display 7 of the gaming machine 1, depending on which set of instructions are followed by the game controller 4. Hence, the instruction sets or playlists determine the video frames to be displayed for a particular animated sequence. In this embodiment, an video presentation comprising video frames 92a, 92b, 92c, 92d that are displayed in order as Frames 1, 2, 3 and 4, respectively, for a particular aspect of game play. For example, the sequence may comprise the display of a star in Frame 1, followed by a JACKPOT message in Frame 2, then a firework exploding in Frame 3 and finally gold coins falling in Frame 4. If the gaming machine 1 has been configured for the games 8, 9 to be played in English, then the playlist programmed at step 78 will be "active", whereas the Spanish playlist programmed at step 80 will be "inactive". The game controller 4 will then follow the English playlist and select a video frame 94 that shows a star from the third video file segment that does not display any language for Frame 1, a video frame 96 from the first (English) video file segment that displays the word JACKPOT for Frame 2 and then video frames 98, 99 from the third video file segment showing the exploding firework and gold coins, respectively, for Frames 3 and 4, since they do not require any language to be displayed. If instead the Spanish language option is selected for the gaming machine 1, then the Spanish playlist will be active, whereas the English playlist will be inactive. The game controller 4 then follows the instruction set 80 to select video frames 94, 98, 99 for Frames 1, 3 and 4 from third video file segment as before with the English playlist. However, the game controller 4 in this case selects a video frame 100 from the second (Spanish) video file segment that displays the Spanish word for jackpot BOTE for Frame 2.

Figure 8:
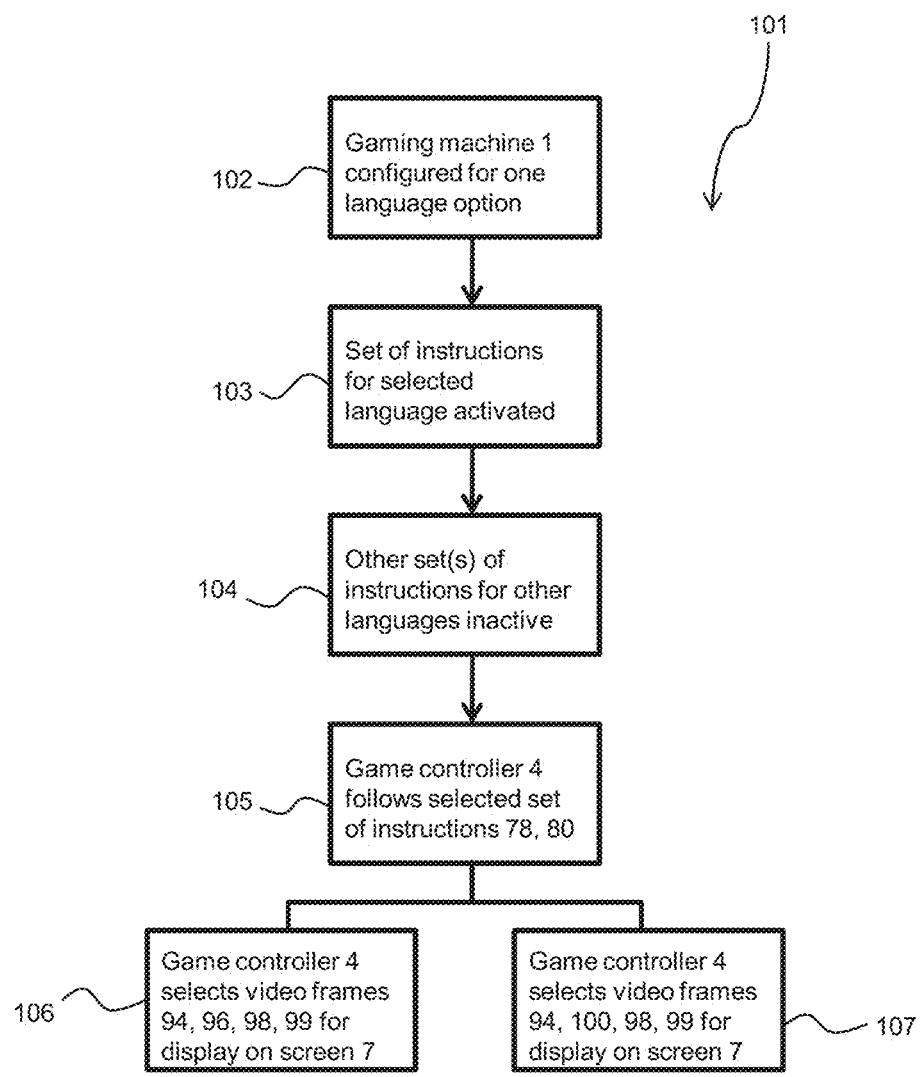
FIG. 8 is a schematic drawing illustrating the method of FIG. 7 in operation.

Referring to FIG. 8, this implementation of the method 70 in an operational process 101 of the gaming machine 1 is illustrated. At step 102, when the gaming machine 1 is installed in the gaming venue, it is configured for one of the available language options stored on the gaming machine, including the game file containing the encoded video file. After configuring the selected language option, the appropriate set of instructions (English or Spanish playlists) is activated at step 103. The other remaining set or sets of instructions for the remaining languages are rendered inactive at step 104. During play of the game 8, 9, the game controller 4 follows the set of instructions for the selected language at step 105. In the case of English being selected, for example, the game controller 4 selects video frames 94, 96, 98, 99 for display on the video screen 7 of the gaming machine 1 at step 106 and in accordance with FIG. 7 above. Similarly, in the case of Spanish being selected, the game controller 4 selects video frames 94, 96, 98, 99 for display on the video screen 7 of the gaming machine 1 at step 107 and in accordance with FIG. 7 above.

Thus, in operation, when the video presentation is played by the game controller 4, Frame 1 is placed onto the display screen 7, which is the same for any language as it has no language specific content. When Frame 2 is played, since there is language specific content for that frame, the game controller 4 selects the video frame 96, 100 for that language as per the activated set of instructions. With Frames 3 and 4, the content is the same no matter what language, so the common video frames 98, 99 are displayed.

In this example of FIGS. 7 and 8, the size of the total video presentation increases by only 25% compared to a single video file as there are only two copies of Frame 2 (five frames instead of four). With the conventional method it would be necessary to provide two complete sets of video frames (Frames 1 to 4) in both languages, resulting in an 100% increase (eight frames instead of four). Thus, in the conventional method, there would be two sets of video frames, having eight frames in total, while in FIGS. 7 and 8, there would be one set of video frames having optional language specific video frames 96, 100 available for selection and totalling only five frames in total. When drawn on the display screen 7, the common video content is first decoded and then only the language specific content which is active is mixed into the common video content and this composite presentation of video image or frames is drawn on the display screen.

Figure 9:
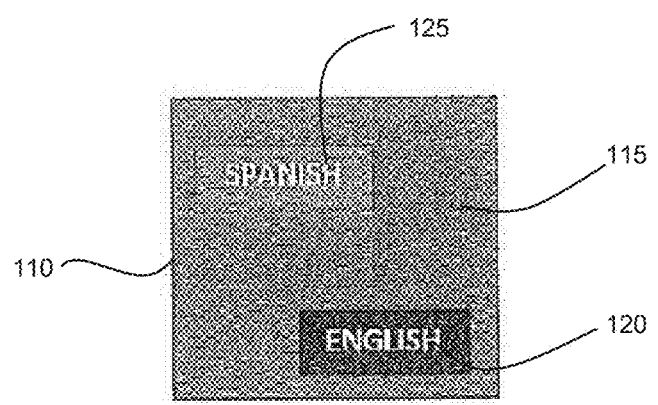
FIG. 9 is a schematic drawing illustrating another implementation of the method of FIG. 6.

Referring to FIG. 9, an alternative implementation of the encoding process for the method 70 is illustrated, where instead of encoding separate language specific video frames, the method 70 encodes a single video frame 110 with different portions 115, 120, 125. The video file or frame portion 115 contains content (video images) that are not language specific and so can be used by each supported language version; the video file or frame portion 120 comprising English language content; and the video file or frame portion 125 comprising Spanish language content.

Figure 10:
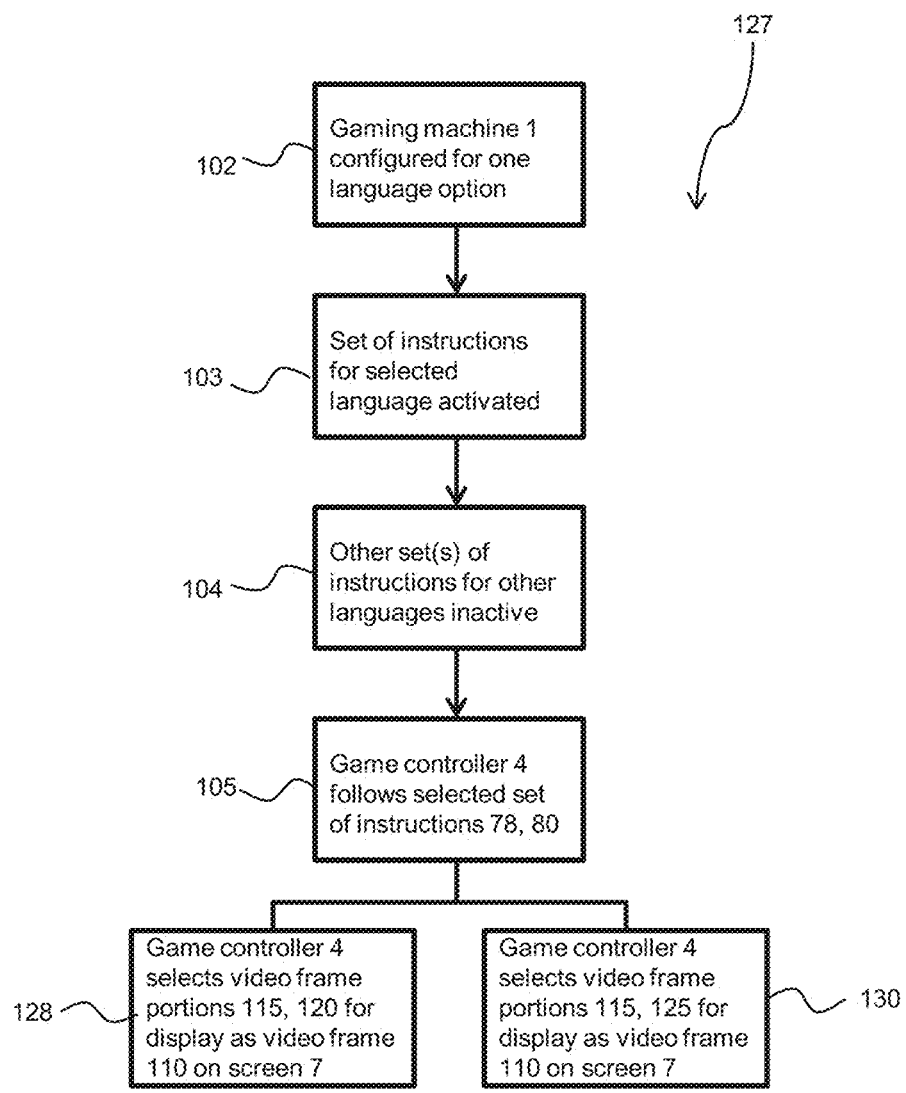
FIG. 10 is a schematic drawing illustrating the method of FIG. 9 in operation.

Referring to FIG. 10, this implementation of the method 70 in an operational process 127 is illustrated, where steps 102 to 105 are the same. However, in following the active set of instructions 78, 80, the game controller 4 selects the appropriate portions of the video frame 110 in accordance with the selected language. In the case of English being selected, for example, the game controller 4 selects video frame portions 115, 120 for display as the video frame 110 on the video screen 7 of the gaming machine 1 at step 128 and in accordance with FIG. 8 above. In the case of Spanish being selected, the game controller 4 selects video frame portions 115, 125 for display as the video frame 110 on the video screen 7 of the gaming machine 1 at step 130 and in accordance with FIG. 8 above. Consequently, the advantage of this implementation is that the game controller 4 is able to access the same set of video frames 110 and depending on the language option configured for the gaming machine, selects the appropriate language content from the relevant video file portion 120, 25.

Thus, in operation, only a single set of video frames are being used with only portions being active for common video content that is not language specific and language specific content. As described in relation to FIGS. 7 and 8, the common video content is first decoded from the video frame portion 115 and then the language specific content which is active is mixed from the video frame portion 120, 125 into the common video content and this composite video image or frame 110 is drawn on the display screen.

As a result, there is only a minor increase in file size compared to a single set of video frames in one language due to the additional language portions for language specific video frames. However, the amount of data saved for a single frame is significantly reduced due to the relatively larger portion 115 of the video frame 110 being common between both languages, again reducing the final video file size. Moreover, there is a quite large and significant reduction in file size for the video file when compared to the conventional method of providing two different sets of video frames for each language.

In view of the above description, it can be seen that while the sets of instructions 78, 80 correspond to English and Spanish language "channels" accessible by the game controller 4 for the games 8, 9 to be played on the gaming machine 1, both channels access common video content that is not language specific in the method 70 as implemented by operational processes 101, 127.

It will be appreciated that the method 70 may be implemented using a combination of both encoding techniques described in FIGS. 7 to 10. For example, where the video frame is slightly different (such as a small number of words), the technique of FIGS. 9 and 10 may be used to only encode portions of the video frame 110 with the relevant language content in portions 120, 125. Where the video frames are substantially or entirely different in language, the technique of FIGS. 7 and 8 may be used to provide separate video frames for each language.

In one embodiment, there may be a separate set of instructions to show only video images or frames that do not contain any language specific content. This "global" set of instructions or "channel" may be accessed at any time during operation of the gaming machine 1.

While the embodiments have been described in relation to encoding video file segments or portions specific for two languages and providing sets of instructions for each language, it will be appreciated that the invention may be implemented to any number of languages. In this instance, the method 70 will encode separate sets of video file segments comprising text in each language and program different sets of instructions to combine the video file segment for each language with the video file segments that do not display any language to create a playlist or channel for each language.

It will also be appreciated that the encoding of the video file segments and programming of the sets of instructions are typically performed by one computing device and another computing device, such as the game controller of an EGM, will execute the sets of instructions once the video files are uploaded onto the EGM. In other embodiments, the computing device that executes the sets of instructions may be externally located from the EGM and instead comprise a separate server in electronic communication with the EGM (or even multiple EGMs connected in a network to the server).

From the description of the above embodiments, it can be seen that there are numerous advantages with the described methods, the primary one being that there is a significant saving in the amount of disk space used by the game file. For example, it is contemplated that implementing this method halves the memory size required in a compact flash memory card, so that game files ordinarily 4 GB in size to now be only 2 GB in size. This in turn enables games files to be installed on cheaper and smaller 2 GB compact flash memory cards instead of 4 GB compact flash memory cards. Another advantage is that the system memory of the gaming machine 1 is also reduced in half as it only needs to store the smaller sized game file instead of its larger conventional counterpart. In other words, only one copy of the video file is now stored in the system memory, whereas in the conventional method extra copies of the video file have to be stored for each supported language.

A further advantage is that this saving in memory storage can be used for other resources, such as other aspects of game design. At present, the memory limits caused by the memory demands for multi-language support places a restriction on game design. For example, text cannot be applied to certain video presentations such as the appearance or awarding of Win Symbols as those symbols are unable to "know" which language is currently selected. To add multi-language support to the graphics engine to play alternative video files with different languages would require significant resources and increases memory storage and usage demands. This meant that games having multi-language support in fact had limited opportunities for displaying text. In contrast, the method described in embodiments of the invention, such limitations no longer exist as the game controller 4 will use the active language option to play the appropriate video frames.

It is also envisaged by the inventors that the invention will permit greater expandability in future, so that it may be used in conjunction with other compression methods to optimise the file size of game files.

Figure 11:
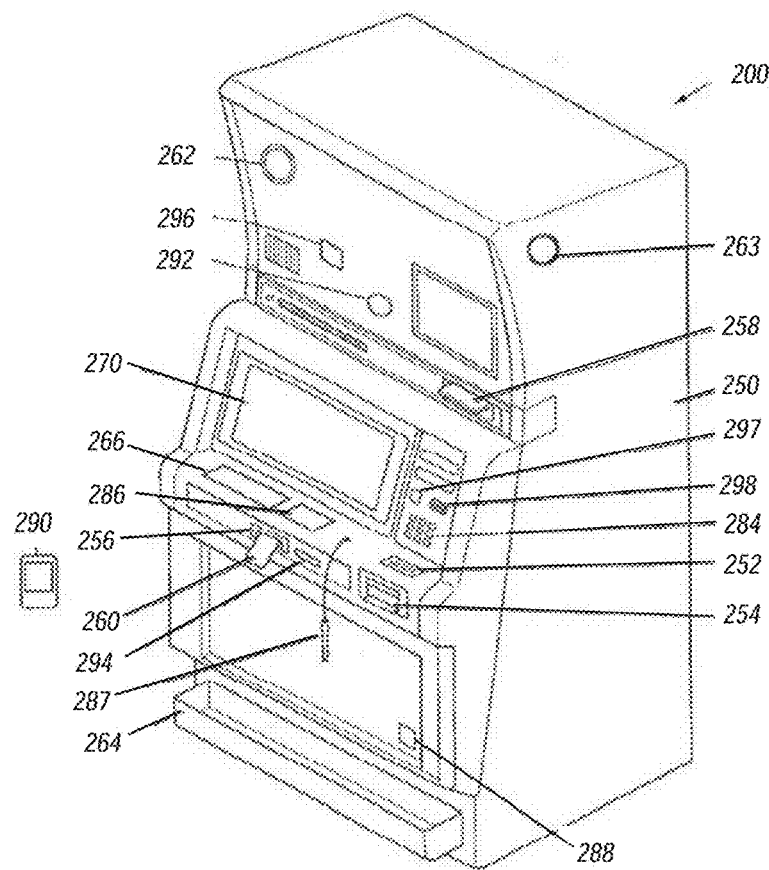
FIG. 11 is a perspective view of a further electronic gaming machine.

Referring to FIG. 11, another EGM 200 is illustrated. The EGM 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the EGM 200. A value transfer device may include any device that can accept value from a player. The topper (not shown) may be mounted to the top of the EGM 200.

If provided on the EGM 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the EGMs 200 may have ticket printers 256 that may be used to print ticket vouchers 260, which could then be used by a player in other EGMs 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the player's gaming habits, etc.

The EGM 200 may include one or more audio speakers 262, a coin payout tray 264, an input control panel 266, and a colour video display unit 270 for displaying images relating to the game or games provided by the EGM 200. The audio speakers 262 may generate audio representing sounds such as the noise of spinning reels, a dealer's voice, music, announcements or any other audio related to a game. The input control panel 266 may be provided with a plurality of pushbuttons or touch-sensitive areas that may be pressed by a player to select games, make wagers, make gaming decisions, etc.

Figure 12:
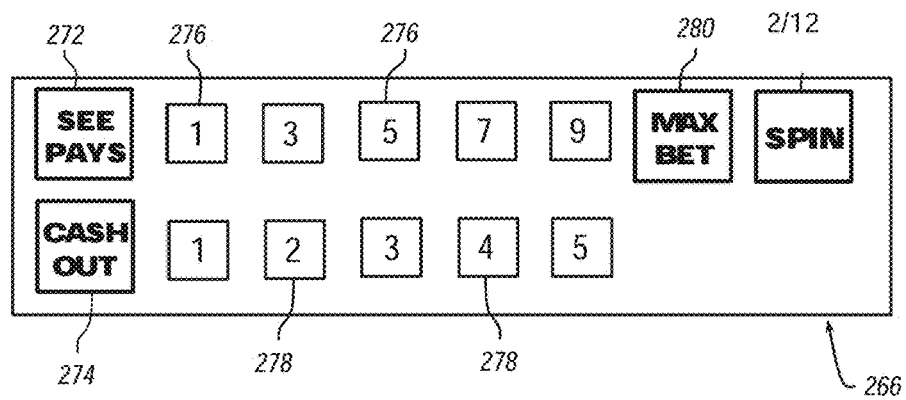
FIG. 12 is a schematic drawing of a control panel for the electronic gaming machine of FIG. 11.

FIG. 12 illustrates one possible embodiment of the control panel 266, which may be used where the EGM 200 having a plurality of reels. The control panel 266 may include a "See Pays" button 272 that, when activated, causes the display unit 270 to generate one or more display screens showing the odds or payout information for the game or games provided by the EGM 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the EGM 200, in which case the EGM 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the EGM 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 12, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the EGM 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the EGM 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the EGM 200 may include a mechanism by which the EGM 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The EGM 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The EGM 200 may include any one of the devices 258, 284, 286, 288, 290, 292, 294, 296, 297, 298, or the EGM 200 may include a combination of some or all of the devices 258, 284, 286, 287, 288, 290, 292, 294, 296, 297, 298.

In operation, a player may identify him or herself to the EGM 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the EGM 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 13:
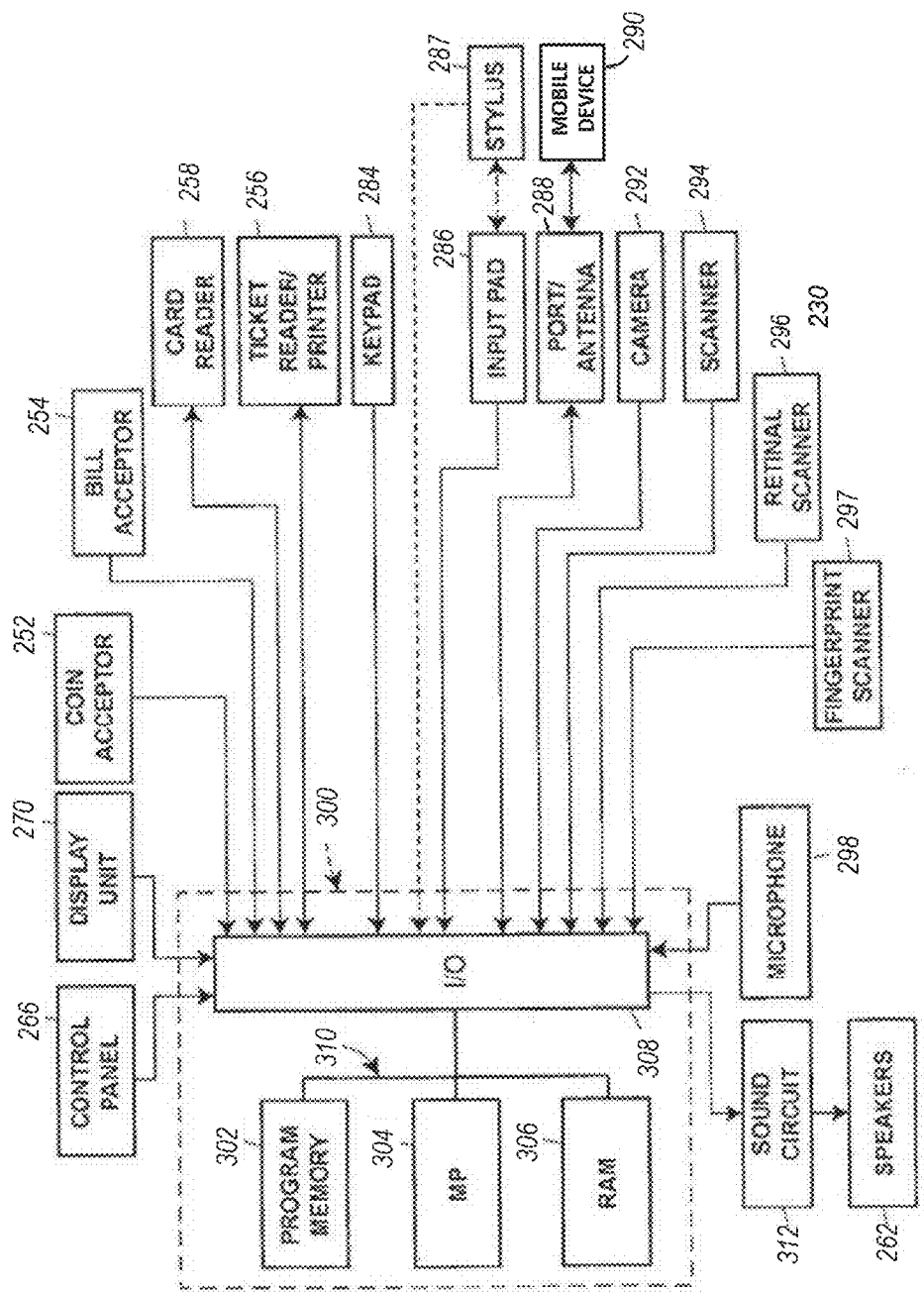
FIG. 13 is a block diagram of the electronic components of the electronic gaming machine of FIG. 11.

FIG. 13 is a block diagram of a number of components that may be incorporated in the EGM 200. Referring to FIG. 13, the EGM 200 may include a controller 300 that may comprise a program memory 304, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 308 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 13 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 13, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 12 may be connected to the I/O circuit 308 via a common bus or other data link that is shared by a number of components. Furthermore, some of the components may be directly connected to the microprocessor 304 without passing through the I/O circuit 308.

In some embodiments, the gaming machine comprises an input device for receiving commands from the player to play the game, wherein the input device comprises one or more buttons in electronic communication with the game controller to transmit the player commands to the game controller.

In some embodiments, the input device comprises one or more buttons on the housing, the buttons being in electronic communication with the game controller. In other embodiments, the buttons are arranged on a console of the housing. Alternatively or additionally, the input device comprises a touch sensitive surface on the display for receiving commands from the player, the touch sensitive surface being in electronic communication with the electronic game controller to transmit the player commands to the game controller.

In some embodiments, the gaming machine comprises a value transfer mechanism for receiving value from the player to make a bet and initiate a play of the game. In other embodiments, the value transfer mechanism also pays the prizes to the player using value in an amount equal to an awarded prize. It is further preferred that the housing comprises the value transfer mechanism. In one embodiment, the value transfer mechanism comprises one or more vending slots for paying and/or receiving value. In other embodiments, the value transfer mechanism comprises a value input/value output device. In further embodiments, the value transfer mechanism comprises a coin slot or acceptor, a paper currency acceptor, a ticket reader and/or printer or a card reader and/or writer.

In some embodiments, the first set of instructions creates a first playlist from the first and third video file segments so that sequential display of the video file segments creates a video presentation in the first language.

In some embodiments, the second set of instructions creates a second playlist from the second and third video file segments so that sequential display of the video file segments creates a video presentation in the second language.

In some embodiments, the first video file segments comprise video frames in the first language to be displayed on the display.

In some embodiments, the second video file segments comprise video frames in the second language to be displayed on the display.

In some embodiments, the third video file segments comprise video frames to be displayed on the display.

In some embodiments, each first video segment comprises a portion of a single video frame to be displayed on the display.

In some embodiments, each second video segment comprises a portion of a single video frame to be displayed on the display.

In some embodiments, each third video segment comprises a portion of a single video frame to be displayed on the display.

In some embodiments, each first, second and third video segment comprises a portion of the same video frame to be displayed on the display. In another embodiment, there are one or more video frames comprising the first, second and third video segments and the first set of instructions creates a first playlist of video frames using the first portion and the third portion of each video frame so that sequential display of the video frames results in a video presentation in the first language. In a further embodiment, execution of the first set of instructions activates the first playlist for display on the display. In yet another embodiment, execution of the first set of instructions renders the second set of instructions inactive.

In a further embodiment, there are one or more video frames comprising the first, second and third video segments and the second set of instructions creates a second playlist of video frames using the second portion and the third portion of each video frame so that sequential display of the video frames results in a video presentation in the second language. In another embodiment, wherein execution of the second set of instructions activates the second playlist for display on the display. In a further embodiment, execution of the second set of instructions renders the first set of instructions inactive.

In some embodiments, the computing device selectively chooses to execute the first set or the second set of instructions. In another embodiment, the selection of one set of instructions renders the other set of instructions inactive. In a further embodiment, the selection of the first or second set of instructions for execution can be changed by the computing device. In yet another embodiment, the computing device selects to execute the first or second set of instructions in response to a command from a user of the gaming machine.

In some embodiments, the method comprises providing a non-transitory computer readable carrier medium storing the video file and using a computing device to access the video file on the computer readable carrier medium.

In some embodiments, selecting one of the first and second playlists activates the selected playlist for use in the gaming machine.

In some embodiments, selecting one of the first and second playlists renders the non-selected playlist inactive to prevent the non-selected playlist being used in the gaming machine.

In some embodiments, the selection of the first and second playlists can be changed in the gaming machine.

In some embodiments, the computing device comprises a game controller of the gaming machine.

In some embodiments, the computing device is external to and in electronic communication with the gaming machine, the computing device being configured to transmit the video file to the gaming. In other embodiments, the computing device is configured to transmit the video file to the gaming machine.

In some embodiments, the computing device is external to and in electronic communication with a plurality of the gaming machines, the computing device being configured to transmit the video file to each of the gaming machines. In other embodiments, the computing device is configured to transmit the video file to each gaming machine.

In some embodiments, the video file comprises part of a game file having image, sound and data information relating to a game to be played on the gaming machine In some embodiments, the gaming machine comprises a mobile electronic gaming device. In other embodiments, the mobile electronic gaming device comprises a handheld electronic device. In one preferred form, the handheld electronic device comprises a handheld electronic gaming device or a smart phone. Alternatively, the gaming machine comprises a computer. In other embodiments, the computer is connected to a communication network.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on a gaming machine. In a further aspect, the invention includes a gaming system configured comprising a central processing unit (such as a computer or computational processor) configured for communication with a gaming machine to perform the invention. In a yet another aspect, the invention includes a non-transitory computer readable or carrier medium carrying computer executable code that, when executed on a central processing unit configured for communication with a gaming machine, causes the central processing unit to perform the invention. In this case, the non-transitory computer readable carrier medium includes an external hard drive, a memory device, including a memory card, smart card, a radio frequency identification (RFID) device, USB key, magnetic card or other electronic storage device.

While the illustrated embodiments include an electronic display on which the array of game positions is displayed, it will be recognized that the disclosed embodiments could instead incorporate mechanical or electro-mechanical reels to define the array of game positions. In fact, to the extent that the game positions, game symbols or operation of the gaming machine described herein would require a modification of such mechanical or electro-mechanical reels, it will be recognized that the embodiment represents a change in the structure or operation of a machine, rather than simply a variation in the rules of playing a game. In addition or in the alternative, the variation in the game positions, game symbols or operation of the gaming machine described herein may be viewed as analogous to a method for utilizing a new game apparatus (like a new deck of cards), rather than simply as a new set of rules in and of themselves.

It will further be appreciated that any of the features in the preferred embodiments of the invention can be combined together and are not necessarily applied in isolation from each other. For example, as mentioned above the method 70 may be implemented using both encoding processes in FIGS. 7 to 10. Similar combinations of two or more features from the above described embodiments or embodiments of the invention can be readily made by one skilled in the art.

Thus, by enabling sharing of common video content and only providing language specific portions for the video files, a significant reduction in memory storage and usage requirements can achieved with the invention. This leads to enabling cheaper memory storage, frees up system memory for other resources, gives more freedom to game design elements and permits efficient use of computer resources in the gaming machine 1, 200. All these advantages of the invention result in an improved operation of the gaming machines 1, 200. Furthermore, since the game files now have a reduced file size, the method permits older gaming machines with lower processing power or memory storage to still implement newer games that have higher quality images that such older gaming machines would ordinarily be unable to implement. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A method of providing a video slot machine game in two or more languages on an electronic gaming machine having a display, comprising:
    a memory storing a video game file comprising at least a first, a second and a third video file segments and a computing device selectively executing a first set or a second set of instructions;
    selecting by a user from a playlist a video presentation representing all video displayed on the display during play of the game;
    at least a first set of one or more video file segments including written text;
    and a second set of one or more video file segments not including written text:
    encoding one or more first video file segments that display the written text of the first set in video frames in a first language to be displayed on the display;
    encoding one or more second video file segments that display the written text of the first set in video frames in second language to be displayed on the display;
    encoding one or more third video file segments in video frames that display the second set on the display:
    programming a first set of instructions executable by the computing device to combine the first and third video file segments into the video presentation in the first language to be displayed on the display;
    programming a second set of instructions executable by the computing device to combine the second and third video file segments into the video presentation in the second language to be displayed on the display;
    storing the one or more first video file segments, the one or more second video file segments, the one or more third video file segments, the first set of instructions, and the second set of instructions on the memory;

executing selectively the first set or the second set of instructions, wherein the selection of one of the first set or the second set of instructions renders the other set of instructions inactive; and displaying the file segments selection into the current video presentation as static or animated video images.

2. The method of claim 1, wherein the selection of the first or second set of instructions for execution can be changed by the computing device.

3. The method of claim 1, wherein the computing device selectively chooses to execute the first or second set of instructions in response to a command from a user of the gaming machine.

* * * * *